United States Patent
Hanks et al.

(10) Patent No.: US 9,780,618 B1
(45) Date of Patent: Oct. 3, 2017

(54) WATER RESISTANT VARNISHED MOTOR COMPONENTS

(71) Applicant: MOOG INC., East Aurora, NY (US)

(72) Inventors: Christopher S. Hanks, Max Meadows, VA (US); Mohammad Khandan Barani, Radford, VA (US); Ronald Flanary, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 239 days.

(21) Appl. No.: 14/211,706

(22) Filed: Mar. 14, 2014

Related U.S. Application Data (60) Provisional application No. 61/791,446, filed on Mar. 15, 2013.

(51) Int. Cl.
*H02K 5/10* (2006.01)
*H02K 15/02* (2006.01)

(52) U.S. Cl.
CPC ............... *H02K 5/10* (2013.01); *H02K 15/02* (2013.01)

(58) Field of Classification Search
CPC .. H02K 5/08; H02K 5/10; H02K 5/12; H02K 15/12; H02K 3/30
USPC ...................................... 310/43, 45
See application file for complete search history.

(56) References Cited

U.S. PATENT DOCUMENTS

| | | | |
|---|---|---|---|
| 8,550,388 B2 | 10/2013 | Donaldson et al. | |
| 8,643,231 B2 | 2/2014 | Flanary | |
| 2001/0005106 A1* | 6/2001 | Bell | H02K 11/0005 310/85 |
| 2005/0074548 A1* | 4/2005 | Puterbaugh | B05D 1/18 427/104 |
| 2010/0270093 A1* | 10/2010 | Sagara | B60L 11/1877 180/65.1 |
| 2011/0120073 A1* | 5/2011 | Flanary | H02K 5/08 56/250 |
| 2011/0171048 A1 | 7/2011 | Snider et al. | |
| 2012/0183680 A1* | 7/2012 | Chou | H02K 15/12 427/104 |
| 2013/0020885 A1* | 1/2013 | Hsieh | H02K 5/128 310/43 |

OTHER PUBLICATIONS

Vacuum Pressure Impregnation Resins, Selection Chart, John C. Dolph Company, available at least 2013.
1/16 inch Milled Glass Fibers, Fibre Glast Developments Corporation, webpage, http://www.fibreglast.com/product/116_inch_Milled_Glass_Fibers_29/Fillers, accessed on Mar. 2, 2014.

* cited by examiner

*Primary Examiner* — Terrance Kenerly
(74) *Attorney, Agent, or Firm* — Hodgson Russ LLP (57) ABSTRACT

For improved water resistance, the stator assembly of a d.c. brushless motor is encapsulated in an overmolding formed from a mixture of a thixotropic, flexible epoxy resin and glass fibers. The overmolding may be applied to the stator assembly by a vacuum pressure impregnation process. The overmolding may also encapsulate a Hall effect circuit board and sensors of the motor.

11 Claims, 9 Drawing Sheets

WATER RESISTANT VARNISHED MOTOR COMPONENTS

CROSS-REFERENCE TO RELATED APPLICATIONS

This application claims priority to U.S. Provisional Application No. 61/791,446 filed on Mar. 15, 2013, the entire disclosure of which is incorporated herein by reference.

FIELD OF THE INVENTION

The present invention relates generally to electric motors, and, more particularly, to water-resistant electric motors.

BACKGROUND OF THE INVENTION

It is known to combine a blender with an ice shaver in a single unit, as disclosed for example in U.S. Pat. Nos. 6,793,167 and 8,282,268. Such units are used in restaurants and bars to produce frozen drinks. The restaurants and bars are often in warm and humid locations where frozen drinks are desirable.

The ice shaver functionality may be provided by an ice-receiving hopper at an upper region of the appliance that contains a rotating blade set and a fixed blade adjacent an exit chute, wherein the rotating blade set moves ice cubes over the fixed blade to shave the ice such that the ice shavings exit the hopper downwardly through the chute for receipt by a blender cup positioned below the chute. A d.c. brushless motor for driving the rotating blade set may be arranged below the hopper, wherein a drive shaft of the motor is drivably connected to a rotary shaft of the blade set.

Because the shaver blade set is situated in ice, heat is conducted out of the motor via the drive shaft. As a result, condensation forms within the motor housing. Condensation also forms on the drive shaft and may migrate toward the motor below. Melting ice arranged directly above the motor may also migrate to the motor. Although the motor housing and drive shaft bearings are sealed by O-rings, water may penetrate into the motor over time. Penetration becomes more likely as the sealing O-rings wear. Exposure to cleaning agents can accelerate wear of these seals. Penetration of water into the motor's stator and electronic sensing circuitry may cause motor failure, or at least may shorten the lifespan of the motor.

In current shaver motors, both the Hall sensor circuit board and the stator are encased in epoxy. However, water still manages to wick through the epoxy coating over time and damage the Hall effect sensor system (i.e., the motor's feedback system) and/or the stator windings.

In some units, the motor is positioned away from a location directly underneath the shaver blade to reduce exposure to water. However, this approach does not eliminate exposure to water, it requires more space, and it adds complexity by requiring mechanical elements (e.g. gears or belts) for transmitting rotational motion from the motor to the shaver blade.

What is needed is an improved motor design that provides better resistance to water damage.

SUMMARY OF THE INVENTION

The invention provides a motor, and also a method of making a motor subassembly, that improves the motor's resistance to water damage. The invention finds application in a motor for driving a rotary blade in an ice shaving appliance, for example a combined ice shaver and blender used to make frozen drinks.

A motor formed in accordance with an embodiment of the invention comprises a rotor assembly rotatable about a rotational axis, a stator assembly including of a plurality of windings angularly spaced about the rotational axis, a circuit board to which a plurality of Hall effect sensors are connected for detecting rotational position of the rotor assembly, and an overmolding encapsulating the stator assembly, wherein the overmolding is formed from a mixture of a thixotropic, flexible epoxy resin and glass fibers. The overmolding may be applied to the stator assembly by a vacuum pressure impregnation process. In an embodiment of the invention, the overmolding further encapsulates the Hall effect circuit board and sensors. The overmolding may be applied simultaneously to the stator assembly and circuit board by vacuum pressure impregnation.

A method of forming a motor subassembly in accordance with an embodiment of the invention comprises the steps of mixing a thixotropic, flexible epoxy resin with glass fibers, loading a stator assembly in a fixture and preheating the stator assembly and fixture, encapsulating the stator assembly in the mixture by vacuum pressure impregnation, curing the mixture at a curing temperature to provide an overmolded stator assembly, and removing the overmolded stator assembly from the fixture. The stator assembly and fixture may be preheated to the curing temperature. The Hall effect circuit board with connected sensors may be loaded into the fixture with the stator assembly and simultaneously encapsulated with the stator assembly, wherein an overmolded stator assembly and circuit board is formed.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

FIGS. 1-4 show a motor 10 formed in accordance with an embodiment of the present invention. Motor 10 may be used to drive a rotary blade in an ice shaving appliance, for example a combined ice shaver and blender used to make frozen drinks. However, motor 10 may be used in other devices that would benefit from increased water resistance.

Motor 10 comprises an external housing 12 that includes a front cover 14, a rear cover 16, and a hollow casing 18 extending between front and rear covers 14, 16. Front cover 14 may be attached to a front end of casing 18 by a plurality of threaded fasteners 15. Similarly, rear cover 16 may be attached to a rear end of casing 18 by a plurality of threaded fasteners 17. In the depicted embodiment, front cover 14 includes a plurality of radially protruding tabs 20 each having a respective fastener-receiving hole 22 for enabling motor 10 to be mounted to environmental structure of the associated device.

Visible in the figures is a motor control cable 24 which may carry wires arranged to extend through a rear opening 26 in housing 12. For example, motor control cable 24 may carry motor leads and thermistor leads. Also visible is a Hall effect cable 28 enclosing wires that extend through a forward opening 30 in housing 12 for connection to a Hall effect circuit board located within housing 12.

Motor 10 comprises a drive shaft 32 forming part of the motor's rotor assembly. As may be seen, drive shaft 32 extends through a shaft opening 34 in front cover 14.

Figure 1:
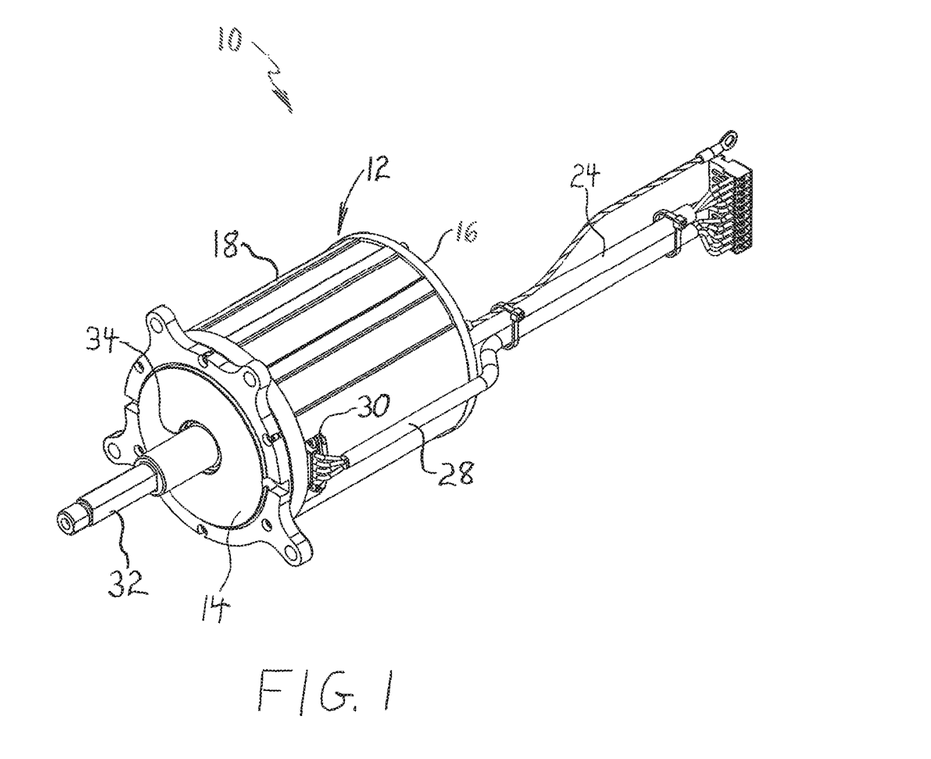
FIG. 1 is a perspective view of a water-resistant motor formed in accordance with an embodiment of the present invention.
Figure 2:
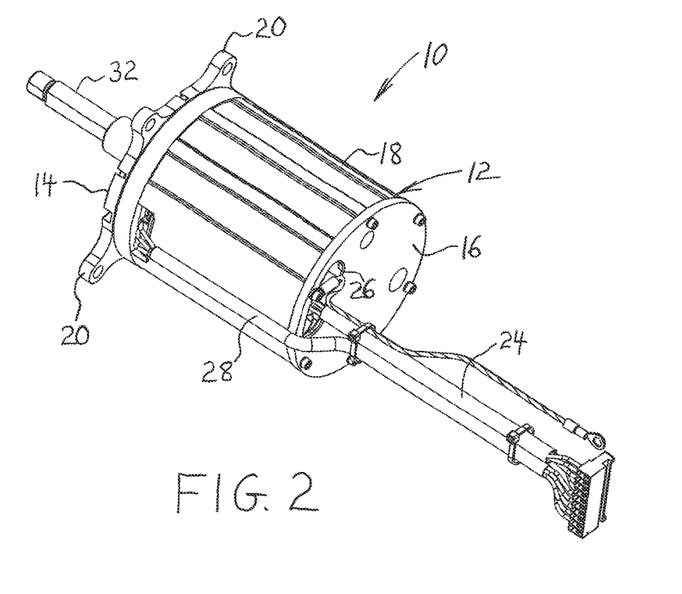
FIG. 2 is another perspective view of the motor shown in FIG. 1.
Figure 3:
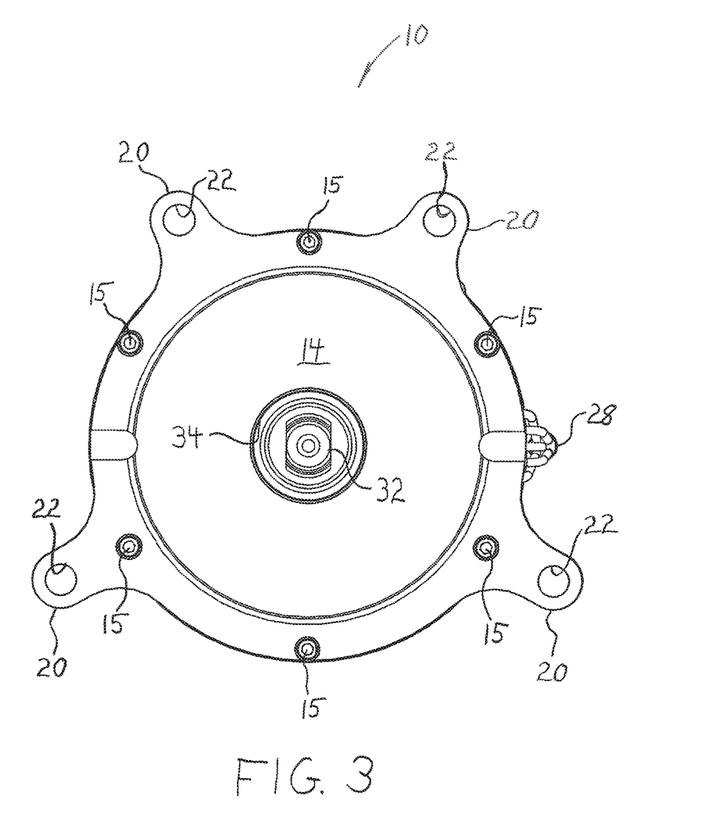
FIG. 3 is a top plan view of the motor shown in FIG. 1.
Figure 4:
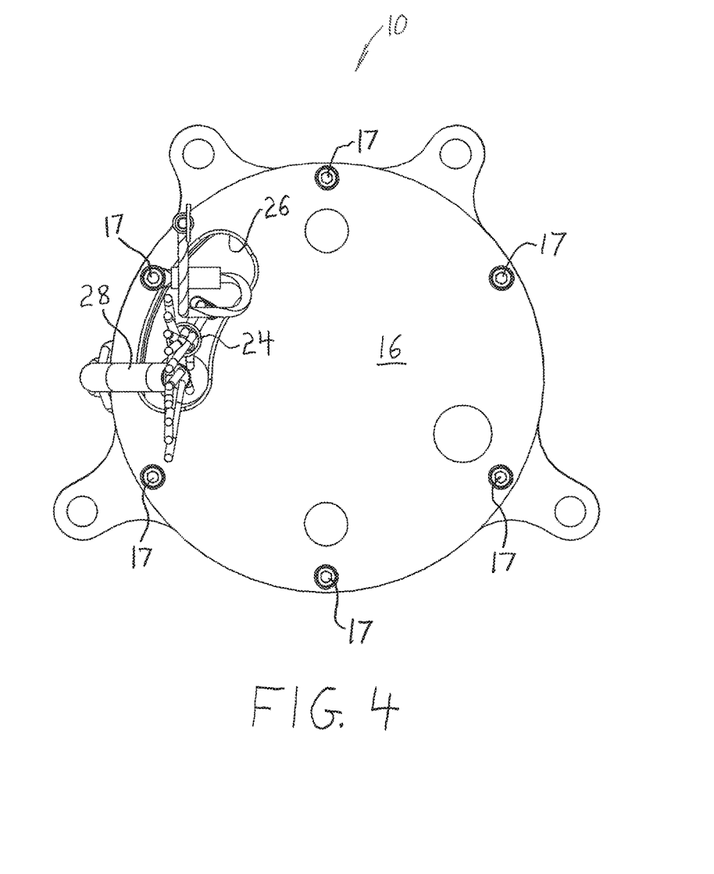
FIG. 4 is a bottom plan view the motor shown in FIG. 1.
Figure 5:
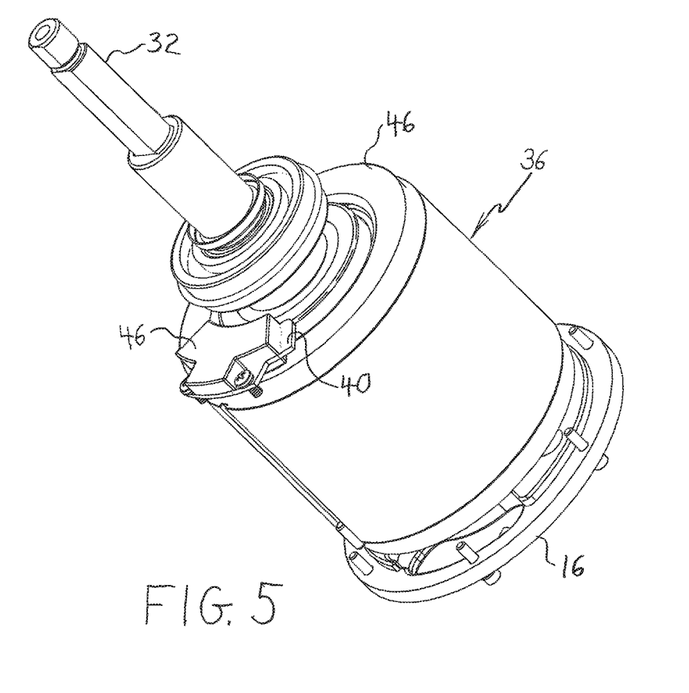
FIG. 5 a perspective view of the motor shown in FIG. 1, wherein portions of the outer housing of the motor are removed to reveal internal structure.
Figure 6:
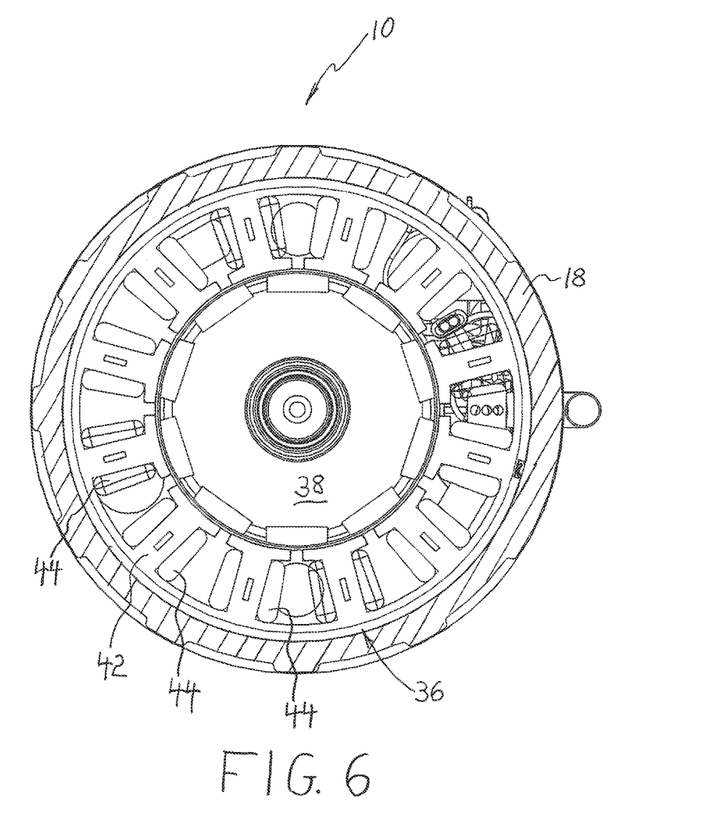
FIG. 6 is a transverse cross-sectional view of the motor shown in FIG. 1.
Figure 7:
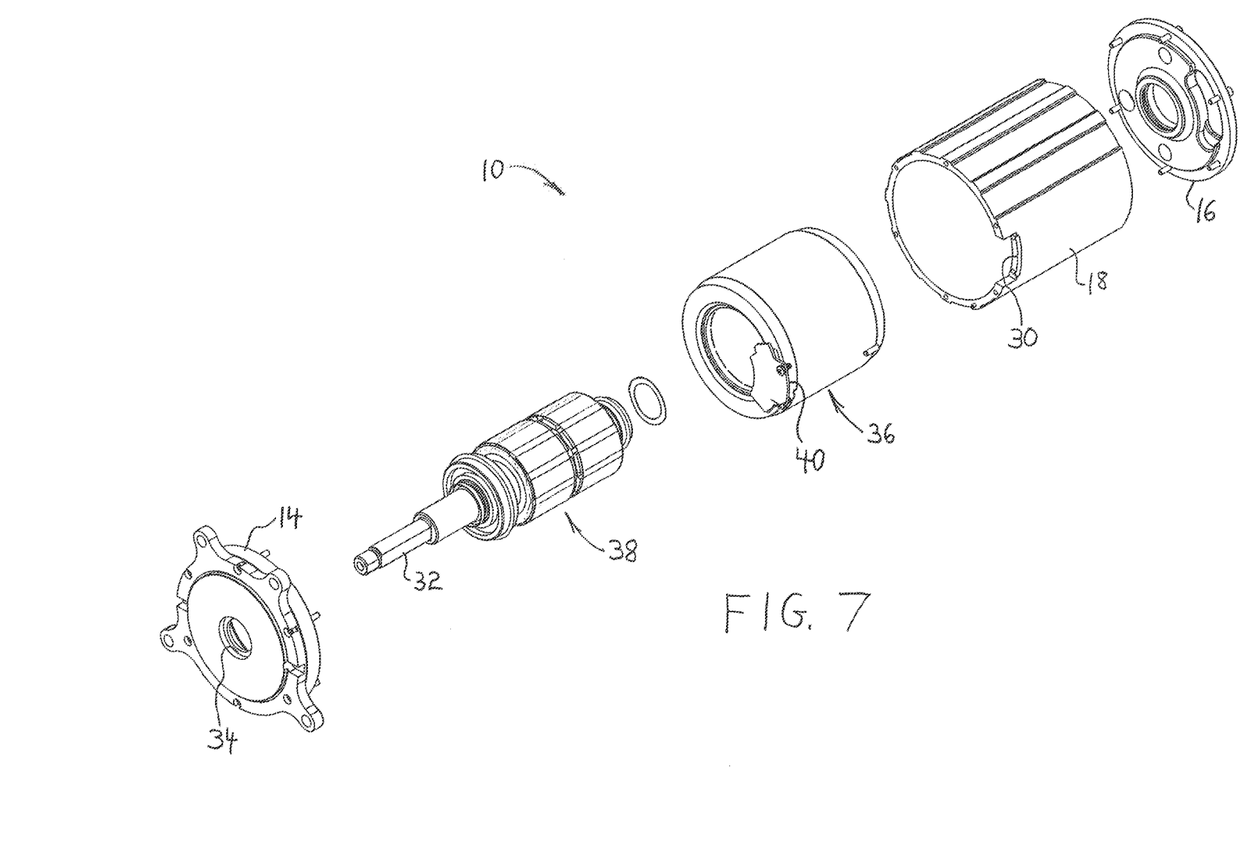
FIG. 7 is an exploded perspective view of the motor shown in FIG. 1.
Figure 8:
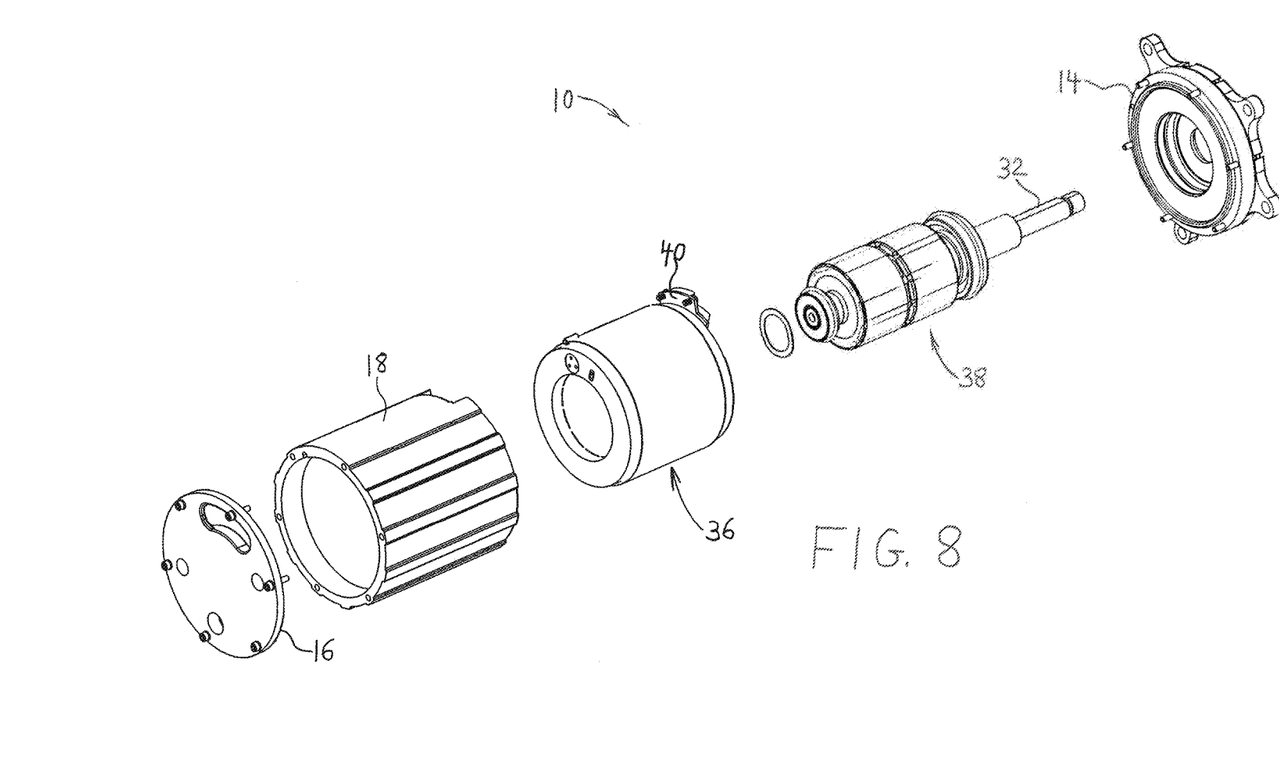
FIG. 8 is another exploded perspective view of the motor shown in FIG. 1.

In FIG. 5, front cover 14 and casing 18 are removed in order to reveal internal structure of motor 10. FIGS. 6-9 also show internal structure. Motor 10 generally comprises a stator assembly 36, a rotor assembly 38, and a Hall effect circuit board 40 to which a plurality of Hall effect sensors 41 (shown in FIG. 9) are connected. Stator assembly 36 includes a laminated core 42 supporting a plurality of stator windings 44.

Figure 9:
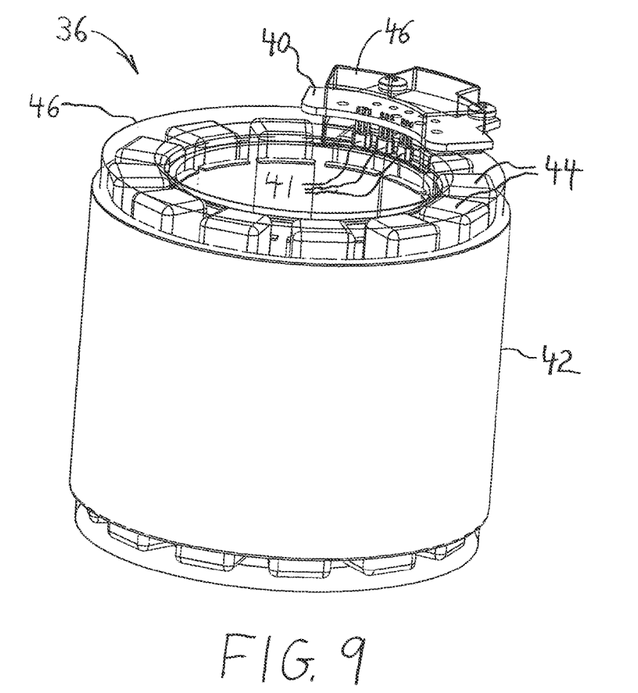
FIG. 9 is a sectioned perspective view illustrating an overmolded stator assembly and circuit board of the motor shown in FIG. 1.

FIG. 9 shows stator assembly 36 and circuit board 40 in isolation. Circuit board 40 may initially be overmolded with an epoxy by a transfer molding process, and then sealed with a sealant material. This enables Hall effect circuit board 40 and sensors 41 to be built and sealed independently of stator assembly 36.

In accordance with the present invention, stator assembly 36 is protected from water infiltration by a customized hydrophobic varnish overmolding 46 applied by a vacuum pressure impregnation ("VPI") process. Overmolding 46 fills the winding cavities and encapsulates the windings 42 of stator assembly 36 to inhibit the ingress of solids and liquids. In an embodiment of the present invention, overmolding 46 may be applied simultaneously to Hall effect circuit board 40 and sensors 41 in the VPI process, providing further protection for circuit board 40 and sensors 41 beyond the initial sealed epoxy overmolding mentioned above.

Encapsulating the windings 44 of stator assembly 36 with the hydrophobic varnish under vacuum as a solid mass reduces the net exposed surface area and areas where water or contaminants can ingress, thereby improving reliability. A tooling fixture for holding stator assembly 36 and circuit board 40 during the VPI process may be configured to provide a thin coating of hydrophobic varnish 46 on an inner diameter of the stator assembly so as not to interfere with rotor assembly 38.

The overmolding varnish 46 may be a mixture of a thixotropic, flexible epoxy resin and glass fibers. By way of non-limiting example, the thixotropic epoxy resin may be DOLPH'S® CC-1152 epoxy resin. The resin is first agitated in a bulk container (e.g. a fifty-five gallon drum), and then resin is withdrawn from the bulk container and mixed with glass fiber filler. A mixture that is 5% filler by weight is currently used, however some adjustment of the mixture is possible without straying from the invention. Mixing for five minutes is found to be sufficient. As one non-limiting example, 1/16 inch milled glass fibers marketed under Item No. 29 by Fibre Glast Development Corp. of Brookville, Ohio may be used as filler in practicing the invention.

In preparation for VPI, stator 36 and circuit board 40 may be loaded into a fixture and preheated to 150° C. for about one hour, more or less depending on mass. The mixed varnish/filler is then caused to flow into the fixture by vacuum, and cured at 150° C. for at least six hours. After curing, the overmolded stator 36 and circuit board 40 are removed from the fixture as a water-sealed subassembly and are ready to be incorporated into motor 10.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A motor comprising:
   a rotor assembly rotatable about a rotational axis;
   a stator assembly including a plurality of windings angularly spaced about the rotational axis;
   a circuit board to which a plurality of Hall effect sensors are connected for detecting rotational position of the rotor assembly;
   an overmolding encapsulating the stator assembly, wherein the overmolding is formed from a mixture of a thixotropic, flexible epoxy resin and glass fibers, wherein the overmolding further encapsulates part of a first surface of the circuit board facing the windings of the stator assembly, encapsulates part of a second surface of the circuit board opposite the first surface, and encapsulates the Hall effect sensors.

2. The motor according to claim 1, wherein the overmolding is applied to the stator assembly by a vacuum pressure impregnation process.

3. The motor according to claim 1, wherein the overmolding is applied to the stator assembly and circuit board simultaneously by a vacuum pressure impregnation process.

4. The motor according to claim 3, wherein the circuit board is encapsulated in epoxy to which a sealant is applied prior to application of the overmolding.

5. The motor according to claim 1, wherein the Hall effect sensors are disposed between the stator assembly and the circuit board.

6. The motor according to claim 1, further comprising a housing and a motor control cable disposed in an opening of the housing, wherein the motor control cable includes motor leads.

7. The motor according to claim 6, wherein the housing further comprises a front cover, a rear cover, and a hollow casing disposed between the front cover and rear cover.

8. The motor according to claim 7, further comprising a drive shaft, wherein the drive shaft is connected with the rotor assembly and is configured to extend through the front cover.

9. The motor according to claim 7, further comprising a plurality of radially protruding tabs disposed on the front cover.

10. A method of forming a motor subassembly, the method comprising the steps of:
    mixing a thixotropic, flexible epoxy resin with glass fibers;

loading a stator assembly in a fixture and preheating the stator assembly and the fixture, wherein a Hall effect circuit board is loaded into the fixture with the stator assembly;

encapsulating the stator assembly in the mixture by vacuum pressure impregnation, wherein the Hall effect circuit board is simultaneously encapsulated with the stator assembly, and wherein the encapsulating is configured to encapsulate part of a first surface of the circuit board facing windings of the stator assembly, encapsulate part of a second surface of the circuit board opposite the first surface, and encapsulate the Hall effect sensors;

curing the mixture at a curing temperature to provide an overmolded stator assembly, wherein an overmolded stator assembly and circuit board is formed; and removing the overmolded stator assembly from the fixture.

11. The method according to claim 10, wherein the stator assembly and the fixture are preheated to the curing temperature.

* * * * *